Feb. 28, 1967  K. SCHLESINGER  3,307,061
ELECTROSTATIC RETURN BEAM CAMERA TUBE
Filed Sept. 16, 1963
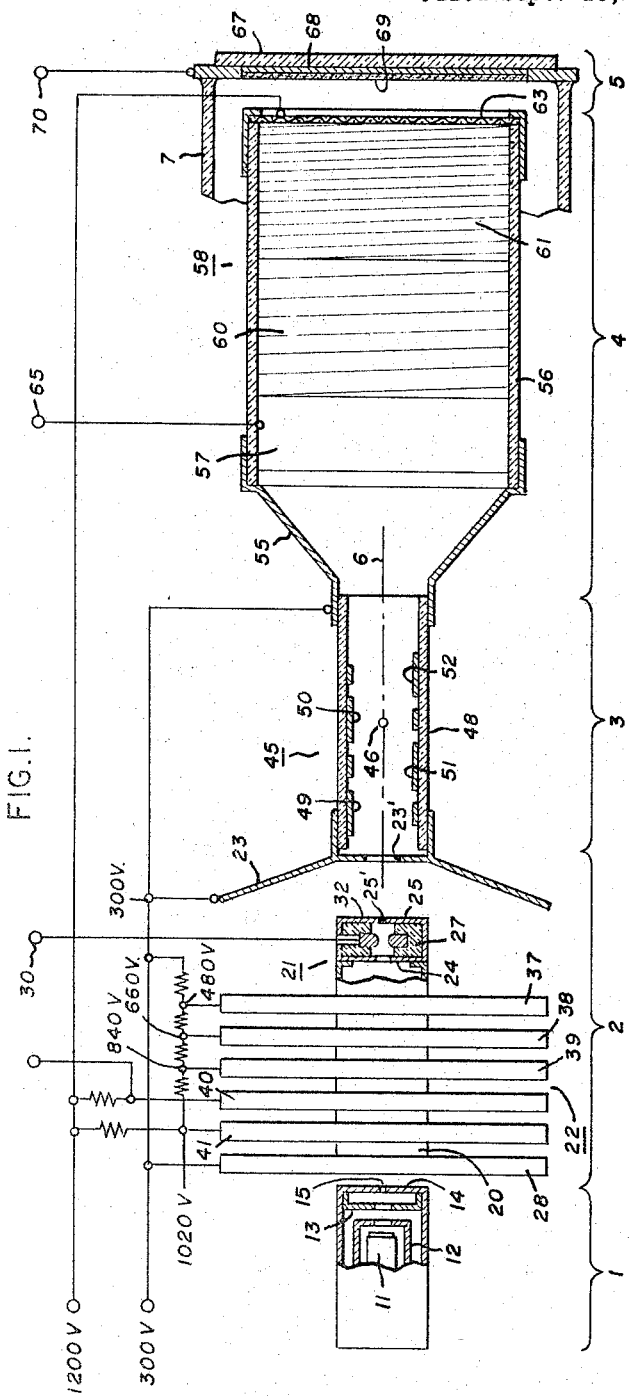
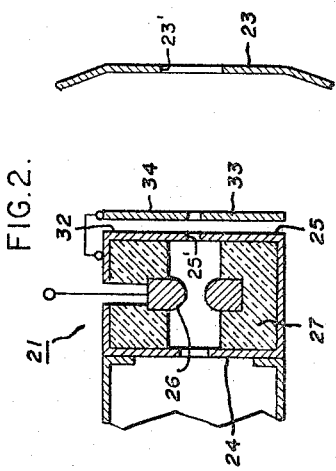
INVENTOR:
KURT SCHLESINGER,
BY *James J. Lichiello*
HIS ATTORNEY.

United States Patent Office 3,307,061
Patented Feb. 28, 1967

3,307,061
ELECTROSTATIC RETURN BEAM CAMERA TUBE
Kurt Schlesinger, Fayetteville, N.Y., assignor to General Electric Company, a corporation of New York
Filed Sept. 16, 1963, Ser. No. 309,171
5 Claims. (Cl. 313—78)

This invention relates to an all-electrostatic camera tube and, in particular, to an arrangement for incorporating an electron multiplier in an all-electrostatic camera tube.

It is an object of this invention to provide a short return system for the return beam in an all-electrostatic camera tube.

It is another object of the invention to provide an improved electron multiplier arrangement in an all-electrostatic camera tube.

It is another object of the invention to provide an electron multiplier arrangement in an all-electrostatic camera tube wherein the operating temperature of the multiplier, and hence the thermionic noise of the multiplier, is reduced with resulting increase in the signal-to-noise ratio of the camera tube output.

It is another object of the invention to provide an electron multiplier arrangement in an all-electrostatic camera tube wherein the output signal level is maintained at a constant and high level independent of deflection.

It is a further object of the invention to provide an electron multiplier arrangement in an all-electrostatic camera tube wherein losses in the return beam are minimized.

It is a further object of the invention to provide an electron multiplier arrangement in an all-electrostatic camera tube wherein the return beam is separated from the forward beam with minimum crosstalk.

Briefly stated, in accordance with the illustrated embodiment of the invention, a camera tube is provided having a thermionic emissive cathode, a target, an electrostatic lens spaced along the tube axis between the cathode and the target, and a drift tube interposed between the cathode and the lens, with an electron multiplier surrounding the drift tube. The lens includes an electrode lying in a plane perpendicular to the tube axis and having a small aperture at the axis through which the forward beam passes, the surface of the electrode facing the target being coated with a secondary electron emitting material and serving as the first dynode of the electron multiplier. A repeller electrode having a large aperture at the tube axis is spaced from the first dynode along the tube axis toward the target. An electrostatic deflection yoke and an electrostatic post-deflection focusing and collimating lens are positioned in that order along the tube axis between the repeller electrode and the target of the camera tube. The first dynode is positioned along the axis of the tube so that the return beam from the target has been fully immobilized against scanning motion and is out-of-focus when it impinges upon the first dynode. The repeller electrode serves to guide the secondary electrons emitted from the first dynode to the second dynode of the electron multiplier surrounding the drift tube for production of an output signal.

The subject matter of the invention is particularly pointed out and distinctly claimed in the concluding portion of the specification. The invention, however, both as to organization and method of operation may best be understood by reference to the following description taken in connection with the accompanying drawing, in which:

FIG. 1 is a longitudinal sectional view of an embodiment of the camera tube of the invention; and FIG. 2 is a partial sectional view of an alternative electron multiplier dynode arrangement which may be employed in the camera tube of FIG. 1.

With reference to the drawing, the all-electrostatic camera tube illustrated therein comprises an electron beam generating section 1, an electron multiplier and focusing section 2, an internal electrostatic deflection section 3, a post-deflection focusing and collimating section 4, and a target section 5. Sections 1-5 are arranged in the order named along the axis 6 of the camera tube and are coaxial with axis 6. A suitable envelope 7 is provided for supporting and enclosing sections 1-5.

Electron beam generating section 1 includes a suitably heated, large area cathode 11, the emission of electrons from cathode 11 being controlled by electrode 12. The emitted electrons are accelerated by anode electrode 13, which serves as the first anode in the electron optical system of the illustrated camera tube. An electrode member 14, lying in a plane perpendicular to axis 6 and having a defining aperture 15 formed therein, is positioned adjacent anode 13. Anode 13 and member 14 are maintained at an appropriate positive potential with respect to cathode 11, for example, a potential of 300 volts, as illustrated. A beam cross-over occurs at defining aperture 15, the defining aperture being substantially coincident with axis 6 of the camera tube and serving as the real object of the electron optical system of the camera tube illustrated. The diameter of aperture 15 should be comparable to the desired spot-size on the target.

Electron multiplier and focusing section 2 includes a drift tube 20, an electrostatic electron lens 21, an electron multiplier 22, and a repeller electrode 23. The electron beam emanating from aperture 15 in electron beam generating section 1 passes through drift tube 20, which is coaxial with axis 6 and terminates in lens 21. Lens 21 is thus spaced from the electron beam source along axis 6 toward target section 5.

Lens 21, which is coaxial with axis 6 and serves as the main focusing lens of the camera tube, is a thin three-element Einzel lens comprising spaced electrodes 24 and 25 and a disk electrode 26, electrodes 24-26 having apertures formed therein substantially coincident with axis 6 to permit the forward electron beam from section 1 to pass therethrough. The aperture in electrode 25 is made as small as possible without unduly interfering with the forward electron beam. Disk electrode 26 is centrally positioned with respect to electrodes 24 and 25 and is electrically insulated therefrom by material 27. Electrodes 24 and 25 are electrically connected to drift tube 20 which is maintained at the potential of first anode 13 through electrode member 28. Electrodes 24 and 25 thus serve as the second anode in the electron optical system of the illustrated camera tube. Disk electrode 26 is substantially depressed in potential with respect to electrodes 24 and 25 by means of a suitable voltage applied to electrical terminal 30 so as to form an electron lens.

The surface 32 of electrode 25 facing the target is coated with a secondary electron emissive material. The return beam from the target impinges upon surface 32, surface 32 thus serving as the first dynode of electron multiplier 22. Alternatively, a separate element positioned forward of electrode 25 may be employed as the first dynode of the electron multiplier, as illustrated at 33 in FIG. 2. Dynode 33 is maintained at anode potential and has a secondary electron emissive surface 24 facing the target.

The cone-shaped repeller electrode 23 (FIG. 1), coaxial with axis 6 of the tube, is positioned forward of electrode 25. Electrode 23 as illustrated in FIG. 1 defines a central aperture 23' which is concentric with exit aperture 25' in electrode 25 for passage of the electron beam into the deflection section 3. Aperture 23' as well as the electron beam path diameter defined by electrodes 49, 50, 51 and 52 is substantially larger in diameter than either exit aperture 25' or repeller electrode aperture 23'.

Repeller electrode 23 guides the secondary electrons emitted from the activated surface 32 of electrode 25 to the second dynode 37 of electron multiplier 22. Repeller electrode 23 is positioned as closely as possible to surface 32 of electrode 25 but the spacing is great enough so that secondary electrons emitted from any point on surface 32 are able to reach second dynode 37 without impinging on the repeller electrode. This criteria can be satisfied either by experimentation or by plotting the electric field between the first dynode, i.e., surface 32 of electrode 25, and second dynode 37. Repeller electrode 23 is normally maintained at the same potential as the first dynode, i.e., at first anode potential. However, electron multiplier output current may be influenced, to some extent, by introducing a small potential difference between electrodes 23 and 25 and adjusting this potential difference to produce a peak output signal in the electron multiplier. Such a peak output signal has been attained with the repeller electrode 23 at a potential which is 10–20 volts positive with respect to the first dynode. As repeller electrode 23 is moved forward along the tube axis away from the optimum position adjacent the first dynode, the potential applied to repeller electrode 23 must be progressively decreased to properly guide the secondary electrons to second dynode 37.

In addition to second dynode 37, electron multiplier 22 includes third dynode 38 fourth dynode 39, collector electrode 40, and fifth dynode 41. Dynodes 37–39, 41 and collector electrode 40 are of annular configuration, as known in the art, and are coaxial with axis 6, surrounding and spaced from drift tube 20. The potentials in the electron multiplier progressively increase from the first dynode to the fifth dynode with the collector electrode, from which the output signal is derived, being at the highest potential. Exemplary voltages, as illustrated, are as follows:

|  | Volts |
|---|---|
| First dynode (surface 32 of electrode 25) | 300 |
| Second dynode 37 | 480 |
| Third dynode 38 | 660 |
| Fourth dynode 39 | 840 |
| Fifth dynode 41 | 1020 |
| Collector electrode 40 (approx.) | 1200 |

Electron multiplier 22 is thus positioned forward of the cathode in the illustrated camera tube. As a result, the heat transfer from the cathode to the electron multiplier is substantially reduced from that which would occur if the electron multiplier surrounded the cathode. The operating temperature and the thermionic noise from the electron multiplier are thereby reduced, with a corresponding increase in the signal-to-noise-ratio of the camera tube output. As an alternative to the electron multiplier structure illustrated, the arrangement of the invention can utilize any type of electron multiplier, so long as the first dynode is positioned between the main focusing lens 21 and the deflection and collimating sections of the camera tube. For example, the additional dynodes and collector electrode may be arranged radially from first dynode 25, rather than axially along drift tube 20, with appropriate modification of the repeller electrode.

Internal electrostatic deflection section 3 comprises an electrostatic deflection yoke 45 which deflects the electron beam emerging from main focusing lens 21 in both the horizontal and vertical directions from a common center of deflection 46 on the tube axis 6. Electrostatic deflection yoke 45 includes a tubular electrical insulating support 48 provided on its interior surface with two pairs of interlaced sinusoidal electrodes, a horizontal deflection pair, 49 and 50, and a vertical deflection pair 51 and 52, which are supplied with suitable target-scanning deflection signals. Electrostatic deflection yoke 45 is preferably of a type which will minimize deflection related astigmatism and other electron-optical aberrations of the electron beam.

Post-deflection focusing and collimating section 4 comprises an electrically conductive member 55 and a tubular electrically insulating support 56, a landing control electrode 57 and a collimating electrostatic lens 58 being provided on the interior surface of support 56. Member 55 and support 56 are coaxial with axis 6. Conductive member 55 is maintained at first anode potential, as illustrated.

Collimating and focusing electrostatic lens 58 comprises a linear spiral electrode 60 of high pitch and a linear spiral electrode 61 of low pitch. Electrodes 60 and 61 are supported on the interior surface of tubular insulative support 56, and may comprise an electrically resistive material coated thereon. The end of spiral electrode 60 adjacent landing control electrode 57 is connected to landing control electrode 57 while the forward end of spiral electrode 61 terminates at a transverse grid or mesh electrode 63. Mesh electrode 63 has the maximum accelerating potential of the electron optical system, as illustrated. Electrodes 60 and 61 are interconnected at their adjacent ends.

The collimating and focusing electrostatic field formed within lens 58 has equipotential surfaces which are hyperboloids of revolution coaxial with axis 6 and asmyptotic to a conical surface of approximately 109° apex angle having its apex located on axis 6 near the forward end of electrostatic deflection yoke 45. The desired hyperboloidal equipotential surfaces are produced by electrodes 60 and 61 which are arranged to produce a substantially parabolic space potential gradient along axis 6, the maximum potential being at mesh 63.

Landing control electrode 57 is provided to control the depth of the potential "saddle" formed within section 4 at the axis. To this end, electrode 57 has an applied voltage which is lower than that applied to member 55. This enables adjustment of of the refractive power of section 4 for optimum perpendicularity of landing of the forward beam on the target, and control of the return beam to insure impingement of the return beam on first dynode 32. To this end, landing control electrode 57 is connected to terminal 65, an appropriate potential lower than anode potential being applied to terminal 65 for regulation of the desired axial space potential gradient.

Target section 5 includes a viewing or target window 67 which closes the forward end of envelope 7. On the interior surface of window 67 is deposited a transparent conductor or signal plate 68 and a photosensitive target 69 of the photoconductive type, for example, antimony trisulfide. An appropriate potential is applied to terminal 70 which is electrically connected to signal plate 68 to provide a decelerating electrostatic field between mesh electrode 63 and photosensitive target 69 for effecting low-velocity landing of the electron beam on the target.

The camera tube illustrated in the drawing is a vidicon in which a charge-density pattern is formed by photoconduction and stored on that surface of the photosensitive target 69 which is scanned by the electron beam of low-velocity electrons. The electron multiplier arrangement of the invention may also be used in a camera tube of the image orthicon type in which an electron image is produced by a photo-emitting surface and focused, by a so-called "image section," on a separate storage target which is scanned on its opposite side by a low-velocity electron beam. Thus, target section 5 may comprise the image section of an image orthicon, as known in the art, rather than the vidicon target illustrated. The electron multiplier arrangement of the invention has application in all camera tubes in which a return beam exists.

In operation, an electron beam from cathode 11 is supplied to defining aperture 15. The electron beam emerging from defining aperture 15 passes through drift tube 20 and is focused by main focusing lens 21. The forward beam then passes through aperture 23' into the electrostatic deflection yoke 45 to which appropriate scanning voltages are applied for deflecting the beam across the surface of photosensitive target 69. The deflected beam then passes through the collimating and focusing field of collimating and focusing electrostatic lens 58, as adjusted by landing control electrode 57. The beam is decelerated after passing through mesh electrode 63. As known in the art, the beam deposits electrons on the target 69 in accordance with the charge pattern thereon. The current in the returning electron beam therefore varies in amplitude in accordance with the variations in the light intensity of the successive portions of the optical image being scanned.

Since the electron optical system in the illustrated camera tube does not employ magnetic fields, but is all-electrostatic, the collimation and scanning motion imparted to the forward beam by sections 3 and 4 is removed from the return beam by the same sections. As the return beam leaves electrostatic deflection yoke 45 and enters the space between first dynode 32 and repeller electrode 23, it has been stripped of all scanning motion. In this region, the return beam is out of focus since it has not yet been subjected to the focusing field of main focusing lens 21. There are no restrictive apertures or other electron beam obstructions in the deflection section which would strip electrons from the beam to adversely affect the operation of electrode 32 and repeller electrode 23. Due to the reciprocity between the trajectories of the forward and return beams, if the forward beam has experienced a perpendicular landing on the target, the return beam is directed generally toward the aperture in electrode 25. However, since the return beam is not focused and the aperture in electrode 25 is small, only a few electrons pass through the aperture into main focusing lens 21. The majority of the electrons in the return beam, due to its out-of-focus condition, strike activated surface 32, i.e., the first dynode, with resulting emission of secondary electrons from surface 32. The secondary electrons are guided by repeller electrode 23 to second dynode 37 of electron multiplier 22. The resulting output signal derived from collector electrode 40 is an amplified reproduction of the current in the return beam, since the number of secondary electrons emitted from a surface is almost exactly proportional to the number of incident electrons impinging thereon.

The electron multiplier arrangement of the invention thus provides a short path for the return beam in contradistinction to the usual path which extends from the target back to the first anode in the electron beam generating section before electron multiplication is commenced. This short-return arrangement is possible in an all-electrostatic camera tube since focusing, deflection, and collimation are effected sequentially along the axis of the tube and, hence, the collimation and scanning imparter to the forward beam can be removed from the return beam to produce a stationary point, i.e., a point at which the return beam has been stripped of all scanning motion, at the plane of the first dynode of the tube before refocusing of the return beam.

This arrangement provides the strongest possible output signal since the return beam does not experience losses prior to multiplication due to the necessity of passing through small apertures, as in the prior art electron multiplier arrangements. The electrostatic deflection section 3 and the post-deflection focusing and collimating section 4 are constructed and arranged so as to provide a wide open, relatively large diameter space, devoid of small apertures at which losses in the return beam can occur. The first restrictive aperture which the return beam encounters is in the electrode which serves as the first dynode of the electron multiplier and the return beam need not pass through this aperture, but rather impinges upon the electrode.

Other advantages of the electron multiplier arrangement of the invention lie in the relative insensitivity of the system to extraneous magnetic fields. This insensitivity of the system to extraneous magnetic fields arises from the high beam velocities reached along the short-return path, and the shortness of the return beam path, the latter feature giving the magnetic field less distance in which to operate upon the return beam. The effect of extraneous magnetic fields on the return beam is thus minimized. It is therefore desirable that the second anode, or the main focusing lens be positioned as far forward in the tube as possible to minimize the length of the return path. Ease of alignment is also attained by the electron multiplier arrangement of the invention since the return beam is badly out-of-focus at the second anode. In addition, crosstalk between the forward and return beams is minimized since the return beam is relatively strong at the point at which electron multiplication commences, the return beam not being required to pass through the restrictive apertures in the electron optical system to the first anode prior to electron multiplication.

Although the invention and its operation has been described with reference to a specific embodiment, the invention is not limited to this embodiment. Many modifications will be obvious to those skilled in the art. It is thus intended in the appended claims to claim all such variations as fall in the true spirit and scope of the invention.

What I claim as new and desire to secure by Letters Patent of the United States is:

1. In an all-electrostatic camera tube including a target and an electron beam source for projecting a forward beam of electrons along the tube axis toward said target with a return beam progressing in the opposite direction along said axis,
   (a) electrostatic focusing means having an exit aperture therein and spaced from said electron beam source along said axis toward said target,
   (b) electrostatic deflection means positioned along said axis between said focusing means and said target and having a common center of deflection therein for both horizontal and vertical beam deflection,
   (c) electron multiplier means having at least a first dynode, said first dynode being positioned along said tube axis between said focusing means and said deflection means, the return beam impinging on said first dynode and producing an output signal in said electron multiplier means,
   (d) said deflection means comprising an electrostatic deflection yoke providing a relatively large diameter beam path therethrough as compared to the said exit aperture of said deflection means so that the return beam progresses from said target toward said first dynode without obstruction, and
   (e) electrostatic means positioned along said axis between said deflection means and said target for collimating the forward beam and controlling the perpendicularity of landing of the forward beam on said target.

2. The invention as recited in claim 1 wherein said electron multiplier includes a second dynode positioned along said axis between said electron beam source and said focusing means.

3. The invention as recited in claim 2 wherein a repeller electrode having an aperture therethrough concentric with said axis is positioned along said axis between said first dynode and said deflection means for guiding the secondary electrons emitted from said first dynode to said second dynode.

4. In an all-electrostatic camera tube including a target and an electron beam source for projecting a forward beam of electrons along the tube axis toward said target with a return beam progressing in the opposite direction along said axis,
   (a) electrostatic focusing means spaced from said electron beam source along said axis toward said target, said focusing means including an electrode having a secondary electron emitting surface facing said target, (b) said electrode having a small aperture therethrough substantially coincident with the axis formed therein, a forward beam from said beam source passing through said aperture, (c) an electrostatic deflection yoke means positioned along said axis between said focusing means and said target and having a common center of the deflection for both the horizontal and vertical deflection of said beam, said deflection yoke providing a relatively large diameter path therethrough as compared to the aperture of said electrode through which the return beam unobstructively passes from said target, and (d) electrostatic means positioned along said axis between said deflection means and said target for collimating the forward beam and controlling the perpendicularity of landing of the forward beam on said target, (e) electron multiplier means having at least a first dynode, said first dynode comprising the secondary electron emitting surface of said electrode, the return beam impinging on said first dynode and producing an output signal in said electron multiplier means.

5. In an all-electrostatic camera tube including a target and an electron beam source for projecting a forward beam of electrons along the tube axis toward said target with a return beam progressing in the opposite direction along said axis, (a) electrostatic focusing means spaced from said electron beam source along said axis toward said target, said focusing means including an electrode having a secondary electron emitting surface facing said target and defining a beam exit aperture therethrough, (b) an axially extending elongated cylindrical electrostatic deflection yoke positioned along said axis between said focusing means and said target, said yoke providing a relatively large diameter space substantially larger than the said exit aperture in said electrode, said deflection yoke providing therein a common center of deflection for both horizontal and vertical deflection of said beam, (c) electrostatic means positioned along said axis between said deflection yoke and said target for collimating the forward beam and controlling the perpendicularity of landing of the forward beam on said target, said means providing a relatively large diameter space, devoid of small apertures, through which the return beam passes, (d) electron multiplier means having at least a first dynode and a second dynode, said first dynode comprising the secondary electron emitting surface of said electrode and said second dynode being positioned along said axis between said electron beam source and said focusing means, the return beam impinging on said first dynode for producing an output signal in said electron multiplier, and (e) a repeller electrode positioned along said axis between said first dynode and said deflection means for guiding to said second dynode the secondary electrons emitted from said first dynode.

References Cited by the Examiner
UNITED STATES PATENTS

| | | | |
|---|---|---|---|
| 2,904,712 | 9/1959 | Schlesinger | 313—78 |
| 3,183,400 | 5/1965 | Jensen et al. | 313—65 |
| 3,191,086 | 6/1965 | Gebel | 313—103 |

JAMES W. LAWRENCE, *Primary Examiner.*

R. JUDD, *Assistant Examiner.*